US011948371B2

(12) United States Patent
Toyoshi

(10) Patent No.: US 11,948,371 B2
(45) Date of Patent: Apr. 2, 2024

(54) INFORMATION PROCESSING APPARATUS, INFORMATION PROCESSING METHOD, AND MOBILE BODY FOR DETECTION OF LANE MARKINGS ON A PASSAGE

(71) Applicant: SONY CORPORATION, Tokyo (JP)

(72) Inventor: Masahiko Toyoshi, Tokyo (JP)

(73) Assignee: SONY CORPORATION, Tokyo (JP)

(*) Notice: Subject to any disclaimer, the term of this patent is extended or adjusted under 35 U.S.C. 154(b) by 665 days.

(21) Appl. No.: 17/059,654

(22) PCT Filed: May 23, 2019

(86) PCT No.: PCT/JP2019/020378
§ 371 (c)(1),
(2) Date: Nov. 30, 2020

(87) PCT Pub. No.: WO2019/235227
PCT Pub. Date: Dec. 12, 2019

(65) Prior Publication Data
US 2021/0209379 A1 Jul. 8, 2021

(30) Foreign Application Priority Data
Jun. 6, 2018 (JP) ................. 2018-108328

(51) Int. Cl.
G06V 20/56 (2022.01)
G06V 20/10 (2022.01)

(52) U.S. Cl.
CPC ...... *G06V 20/588* (2022.01); *B60R 2300/301* (2013.01); *B60R 2300/302* (2013.01);
(Continued)

(58) Field of Classification Search
CPC ...... G06V 20/588; G06V 20/194; B60R 1/00; B60R 2300/301; B60R 2300/302;
(Continued)

(56) References Cited

U.S. PATENT DOCUMENTS

2009/0097708 A1* 4/2009 Mizuta .................... B60R 11/04
382/104
2017/0006234 A1 1/2017 Higuchi et al.
(Continued)

FOREIGN PATENT DOCUMENTS

DE 112016000689 T5 10/2017
JP 2004-297405 A 10/2004
(Continued)

OTHER PUBLICATIONS

Hillel, et al, "Recent progress in road and lane detection: A survey", Machine Vision and Applications, vol. 25, No. 3, Apr. 2014, pp. 727-745.

(Continued)

Primary Examiner — Siamak Harandi
(74) Attorney, Agent, or Firm — CHIP LAW GROUP

(57) ABSTRACT

The present technique relates to an information processing apparatus, an information processing method, a program, and a mobile body which enable accuracy of detection processing related to a passage around a mobile body to be improved. The information processing apparatus includes: a transforming unit configured to respectively transform a plurality of photographed images with partially overlapping photographing ranges into bird's eye images; a compositing unit configured to generate a composite image by compositing a plurality of the bird's eye images; and a detecting unit configured to perform detection processing related to a passage around a mobile body based on the composite image. For example, the present technique can be applied to an apparatus that detects a lane marking of a road.

14 Claims, 9 Drawing Sheets

(52) U.S. Cl.
CPC ... *B60R 2300/607* (2013.01); *B60R 2300/804* (2013.01); *G06V 20/194* (2022.01)

(58) Field of Classification Search
CPC ........ B60R 2300/607; B60R 2300/804; G06T 7/00; G06T 7/60
See application file for complete search history.

(56) References Cited

U.S. PATENT DOCUMENTS

| | | |
|---|---|---|
| 2017/0184396 A1 | 6/2017 | Tateishi et al. |
| 2019/0026918 A1 | 1/2019 | Gomezcaballero et al. |
| 2019/0094040 A1* | 3/2019 | Lewis .................. G01S 17/931 |

FOREIGN PATENT DOCUMENTS

| | | |
|---|---|---|
| JP | 2015-192198 A | 11/2015 |
| JP | 2016-149613 A | 8/2016 |
| JP | 2017-116450 A | 6/2017 |
| WO | 2017/145543 A1 | 8/2017 |

OTHER PUBLICATIONS

International Search Report and Written Opinion of PCT Application No. PCT/JP2019/020378, dated Jun. 18, 2019, 10 pages of ISRWO.

\* cited by examiner

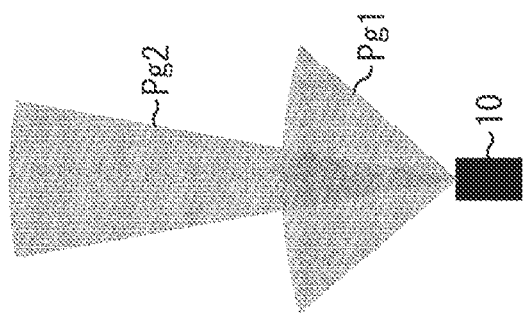
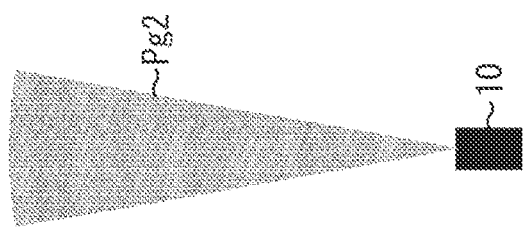
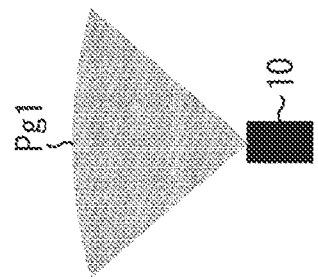

INFORMATION PROCESSING APPARATUS, INFORMATION PROCESSING METHOD, AND MOBILE BODY FOR DETECTION OF LANE MARKINGS ON A PASSAGE

CROSS REFERENCE TO RELATED APPLICATIONS

This application is a U.S. National Phase of International Patent Application No. PCT/JP2019/020378 filed on May 23, 2019, which claims priority benefit of Japanese Patent Application No. JP 2018-108328 filed in the Japan Patent Office on Jun. 6, 2018. Each of the above-referenced applications is hereby incorporated herein by reference in its entirety.

TECHNICAL FIELD

The present technique relates to an information processing apparatus, an information processing method, a program, and a mobile body and, particularly, to an information processing apparatus, an information processing method, a program, and a mobile body which are suitably used when performing detection processing with respect to a passage around a mobile body.

BACKGROUND ART

Conventionally, methods of detecting roads and lanes using a camera and LiDAR (Light Detection and Ranging) have been proposed (for example, refer to NPL 1).

CITATION LIST

Non-Patent Literature

[NPL 1]
Aharon Bar Hillel and three others, "Recent Progress in Road and Lane Detection: a survey", Machine Vision and Applications, April 2014, Volume 25, Issue 3, pp 727-745

SUMMARY

Technical Problem

On the other hand, configurations of roads vary depending on a shape (for example, a straight line or a curve), lane markings, the number of lanes, the presence or absence of a sidewalk or a shoulder, and the like. In addition, even a same road may appear significantly different depending on circumstances (for example, weather or time of day). Therefore, the emergence of a technique that improves accuracy of detection processing of a configuration or the like of a road regardless of differences in configurations, circumstances, and the like is eagerly anticipated.

The present technique has been devised in consideration of the circumstances described above and an object thereof is to improve accuracy of detection processing related to a passage (for example, a road) around a mobile body.

Solution to Problem

An information processing apparatus according to a first aspect of the present technique includes: a transforming unit configured to respectively transform a plurality of photographed images with partially overlapping photographing ranges into bird's eye images; a compositing unit configured to generate a composite image by compositing a plurality of the bird's eye images; and a detecting unit configured to perform detection processing related to a passage around a mobile body based on the composite image.

An information processing method according to the first aspect of the present technique includes the steps of: respectively transforming a plurality of photographed images with partially overlapping photographing ranges into bird's eye images; generating a composite image by compositing a plurality of the bird's eye images; and performing detection processing related to a passage around a mobile body based on the composite image.

A program according to the first aspect of the present technique causes a computer to execute processing for: respectively transforming a plurality of photographed images with partially overlapping photographing ranges into bird's eye images; generating a composite image by compositing a plurality of the bird's eye images; and performing detection processing related to a passage around a mobile body based on the composite image.

A mobile body according to a second aspect of the present technique includes: a photographing unit configured to photograph a plurality of photographed images with partially overlapping photographing ranges; a transforming unit configured to respectively transform a plurality of the photographed images into bird's eye images; a compositing unit configured to generate a composite image by compositing a plurality of the bird's eye images; a detecting unit configured to perform detection processing related to a passage around a mobile body based on the composite image; and a motion control unit configured to control motion based on a result of the detection processing.

In the first aspect of the present technique, a plurality of photographed images with partially overlapping photographing ranges are respectively transformed into bird's eye images, a composite image is generated by compositing a plurality of the bird's eye images, and detection processing related to a passage around a mobile body is performed based on the composite image.

In the second aspect of the present technique, a plurality of photographed images with partially overlapping photographing ranges are photographed, a plurality of the photographed images are respectively transformed into bird's eye images, a composite image is generated by compositing a plurality of the bird's eye images, detection processing related to a passage around a mobile body is performed based on the composite image, and control of motion is performed based on a result of the detection processing.

Advantageous Effects of Invention

According to the first aspect or the second aspect of the present technique, accuracy of detection processing related to a passage around a mobile body improves.

It should be noted that the advantageous effects described above are not necessarily restrictive and any of the advantageous effects described in the present disclosure may apply.

BRIEF DESCRIPTION OF DRAWINGS

FIGS. 6A, 6B, and 6C is a are diagrams showing an example of ranges of an optical bird's eye image and a telescopic bird's eye image.

DESCRIPTION OF EMBODIMENTS

Hereinafter, modes for implementing the present technique will be described. The descriptions will be given in the following order.
1. First Embodiment
2. Second Embodiment
3. Modifications
4. Other 1. First Embodiment First, a first embodiment of the present technique will be described with reference to FIGS. 1, 2, 3, 4, 5, 6A, 6B, and 6C.
<Configuration Example of Vehicle 10>

Figure 1:
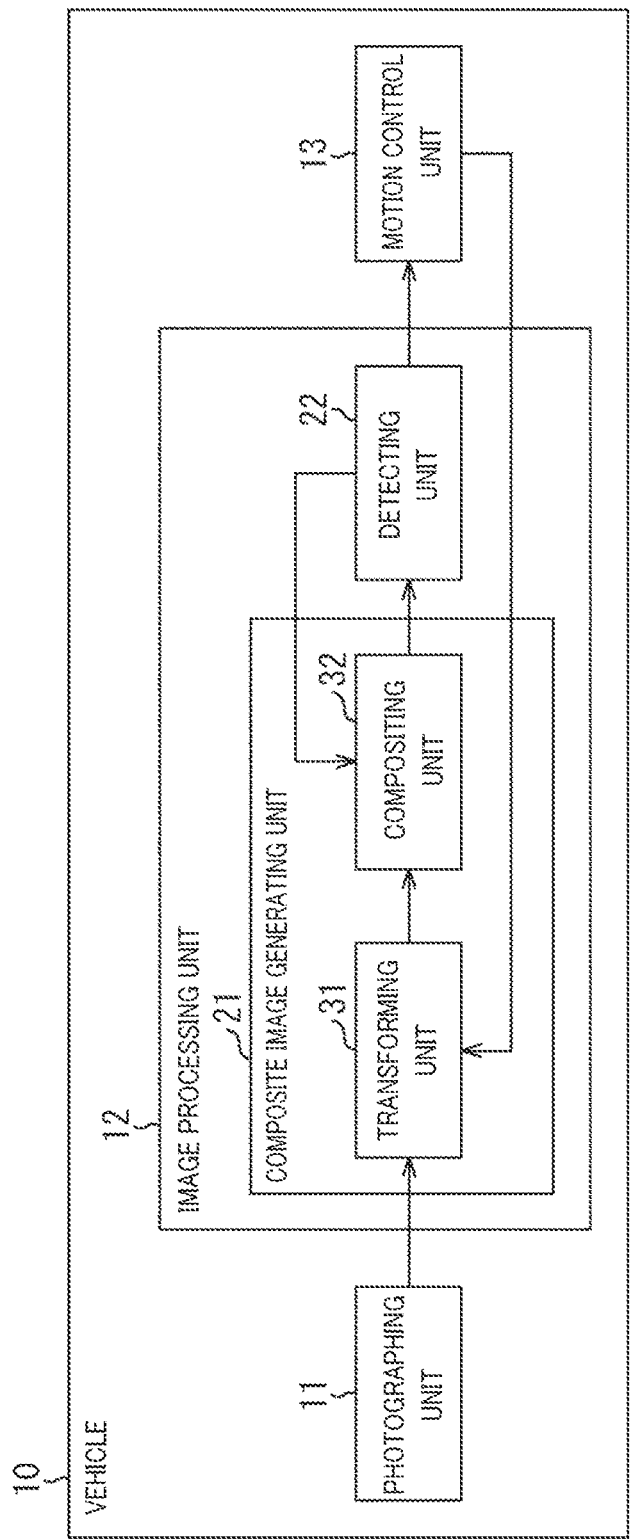
FIG. 1 is a block diagram showing a first embodiment of a vehicle to which the present technique has been applied.

FIG. 1 shows a configuration example of a vehicle 10 that represents a first embodiment of a vehicle to which the present technique has been applied.

The vehicle 10 includes a photographing unit 11, an image processing unit 12, and a motion control unit 13.

For example, the photographing unit 11 includes a photographing apparatus which includes a zoom lens and which is capable of changing an angle of view and a focal length. In addition, the photographing unit 11 is provided at a position where the front of the vehicle 10 can be photographed. The photographing unit 11 photographs the front of the vehicle 10 while alternately switching between two angles of view and supplies the images having been photographed (hereinafter, referred to as photographed images) to a transforming unit 31 of a composite image generating unit 21 of the image processing unit 12.

Hereinafter, among the photographed images that are taken by the photographing unit 11, a photographed image with a wider angle of view will be referred to as a wide angle image and a photographed image with a smaller angle of view will be referred to as a telescopic image. The wide angle image and the telescopic image have partially overlapping photographing ranges.

Based on the wide angle image and the telescopic image photographed by the photographing unit 11, the image processing unit 12 performs detection processing of a lane marking (for example, a white line) of a road in front of the vehicle 10. The image processing unit 12 includes the composite image generating unit 21 and a detecting unit 22.

The composite image generating unit 21 generates a composite image obtained by compositing the wide angle image and the telescopic image. The composite image generating unit 21 includes the transforming unit 31 and a compositing unit 32.

The transforming unit 31 transforms the wide angle image and the telescopic image into bird's eye images and supplies the compositing unit 32 with the transformed bird's eye images. Hereinafter, the bird's eye image having been transformed from the wide angle image will be referred to as a wide angle bird's eye image and the bird's eye image having been transformed from the telescopic image will be referred to as a telescopic bird's eye image.

The compositing unit 32 generates a composite image obtained by compositing the wide angle bird's eye image and the telescopic bird's eye image and supplies the detecting unit 22 with the composite image. When necessary, the compositing unit 32 composites two bird's eye images using a detection result of a lane marking by the detecting unit 22.

Based on the composite image, the detecting unit 22 performs detection processing of a lane marking on the road in front of the vehicle 10. The detecting unit 22 supplies the compositing unit 32 and the motion control unit 13 with data indicating a detection result of a lane marking.

The motion control unit 13 controls motion of the vehicle 10 based on the detection result of a lane marking on the road in front of the vehicle 10 and the like. For example, the motion control unit 13 controls acceleration, deceleration, stopping, steering, automated driving, and the like of the vehicle 10. In addition, the motion control unit 13 supplies the transforming unit 31 with data indicating a speed of the vehicle 10.
<Configuration Example of Detecting Unit 22>

Figure 2:
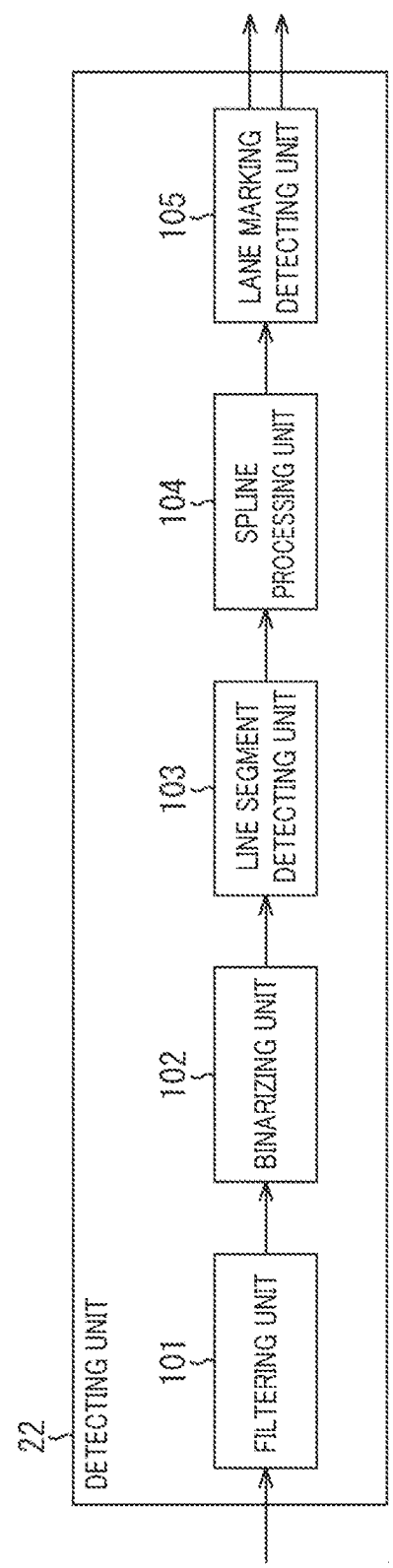
FIG. 2 is a block diagram showing a configuration example of a detecting unit shown in FIG. 1.

FIG. 2 shows a configuration example of the detecting unit 22.

The detecting unit 22 includes a filtering unit 101, a binarizing unit 102, a line segment detecting unit 103, a spline processing unit 104, and a lane marking detecting unit 105.

The filtering unit 101 performs filtering of the composite image using a prescribed filter and extracts an edge in the composite image. The filtering unit 101 supplies the binarizing unit 102 with an image (hereinafter, referred to as an edge image) obtained by extracting an edge of the composite image.

The binarizing unit 102 performs binarization processing using a prescribed threshold with respect to the edge image and supplies the line segment detecting unit 103 with an obtained binarized image.

The line segment detecting unit 103 performs detection processing of a line segment inside the binarized image. The line segment detecting unit 103 supplies the spline processing unit 104 with an image (hereinafter, referred to as a line segment-detected image) indicating a detection result of a line segment.

The spline processing unit 104 performs spline processing with respect to the line segment-detected image and detects a curve in the line segment-detected image. The spline processing unit 104 supplies the lane marking detecting unit 105 with an image (hereinafter, referred to as a spline image) indicating a detection result of a curve.

Based on the curve inside the spline image, the lane marking detecting unit 105 detects a lane marking on the road in front of the vehicle 10. The lane marking detecting unit 105 supplies the compositing unit 32 and the motion control unit 13 with data indicating a detection result of a lane marking.

<Lane Marking Detection Processing>

Next, lane marking detection processing to be executed by the vehicle 10 will be described with reference to the flow chart shown in FIG. 3.

For example, the processing is started when the vehicle 10 is started and an operation for starting driving is performed such as when an ignition switch, a power switch, a start switch, or the like of the vehicle 10 is turned on. In addition, for example, the processing is ended when an operation for ending driving is performed such as when the ignition switch, the power switch, the start switch, or the like of the vehicle 10 is turned off.

In step S1, the photographing unit 11 photographs a wide angle image. Specifically, the photographing unit 11 photographs the front of the vehicle 10 in a state where the focal length of the zoom lens is set short and an angle of view thereof is set wide. The photographing unit 11 supplies the transforming unit 31 with a wide angle image obtained as a result of the photography.

In step S2, the photographing unit 11 photographs a telescopic image. Specifically, the photographing unit 11 photographs the front of the vehicle 10 in a state where the focal length of the zoom lens is set long and an angle of view thereof is set narrow. The photographing unit 11 supplies the transforming unit 31 with a telescopic image obtained as a result of the photography.

In step S3, the transforming unit 31 transforms the wide angle image and the telescopic image into bird's eye images.

For example, the transforming unit 31 transforms the wide angle image and the telescopic image into bird's eye images using a function f1 ($\alpha$, $\beta$, $\gamma$, s) which is a transformation function and a function f2 (v, $\Delta$t).

Hereinafter, the function f1 ($\alpha$, $\beta$, $\gamma$, s) may be simply referred to as the function f1, the function f2 (v, $\Delta$t) may be simply referred to as the function f2, and function f1 ($\alpha$, $\beta$, $\gamma$, s)+function f2 (v, $\Delta$t) may be simply referred to as function f1+f2.

The function f1 is a function used in the transformation from a photographed image into a bird's eye image.

A pitch angle $\alpha$, a yaw angle $\beta$, and a roll angle $\gamma$ which are variables of the function f1 indicate a mounting angle (an Euler angle) of the photographing unit 11. A scale s indicates an enlargement ratio or a reduction ratio of a bird's eye image after the transformation.

Definitions of the pitch angle $\alpha$, the yaw angle $\beta$, and the roll angle $\gamma$ will now be described with reference to FIG. 4.

Figure 4:
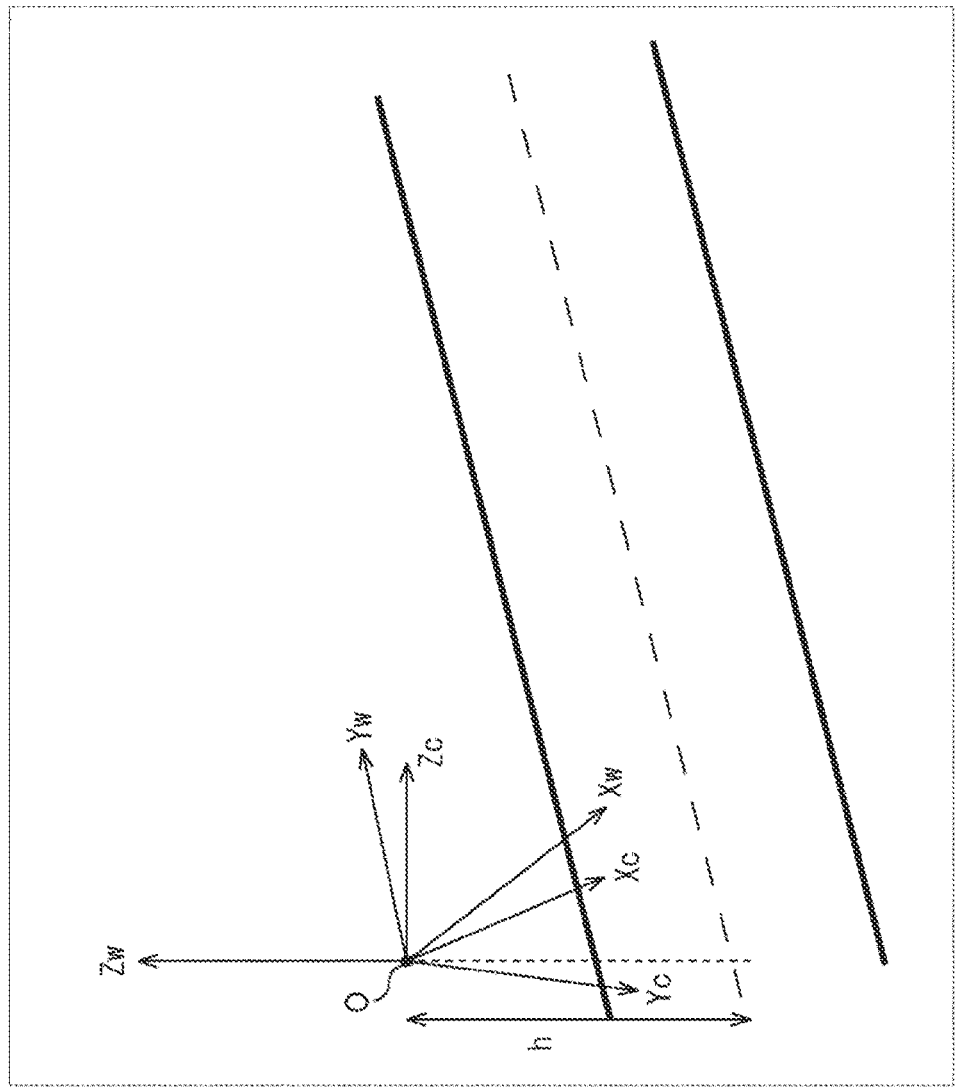
FIG. 4 is a diagram showing an example of a world coordinate system and a camera coordinate system.

FIG. 4 shows an example of a world coordinate system and a camera coordinate system of the photographing unit 11.

A point O in FIG. 4 indicates an optical center of the photographing unit 11 and h denotes a height of the optical center O from ground.

The world coordinate system is defined by an Xw axis, a Yw axis, and a Zw axis which are mutually perpendicular. The Xw axis and the Yw axis are axes parallel to ground and the Zw axis is an axis that is perpendicular to ground.

The camera coordinate system is defined by an Xc axis, a Yc axis, and a Zc axis which are mutually perpendicular. The Xc axis is an axis in a lateral direction (a left-right direction) of the photographing unit 11, the Yc axis is an axis in a longitudinal direction (an up-down direction) of the photographing unit 11, and the Zc axis is an axis that coincides with an optical axis of the photographing unit 11.

The pitch angle $\alpha$ indicates an orientation of the Zc axis (the optical axis of the photographing unit 11) in a direction perpendicular to ground. Specifically, the pitch angle $\alpha$ indicates an angle of the Zc axis with respect to the Yw axis on a plane which is constituted by the Yw axis and the Zw axis of the world coordinate system and which is perpendicular to ground.

The yaw angle $\beta$ indicates an orientation of the Zc axis (the optical axis of the photographing unit 11) in a direction parallel to ground. Specifically, the yaw angle $\beta$ indicates an angle of the Zc axis with respect to the Yw axis on a plane which is constituted by the Xw axis and the Yw axis of the world coordinate system and which is parallel to ground.

The roll angle $\gamma$ is an angle in a direction of rotation of the Zc axis (the optical axis of the photographing unit 11) and indicates an angle of the Xc axis with respect to the Xw axis on a plane which is constituted by the Xw axis and the Zw axis of the world coordinate system and which is perpendicular to ground.

For example, the function f1 includes processing for performing coordinate transformation from a photographed image to a bird's eye image using a transformation matrix T represented by expression (1) below.

[Math. 1]

$$T = h \begin{bmatrix} -\frac{1}{fu}c2 & \frac{1}{fv}s1 \cdot s2 & \frac{1}{fu}cu \cdot c2 - \frac{1}{fv}cv \cdot s1 \cdot s2 - c1 \cdot s2 & 0 \\ \frac{1}{fu}s2 & \frac{1}{fv}s1 \cdot c1 & -\frac{1}{fu}cu \cdot s2 - \frac{1}{fv}cv \cdot s1 \cdot c2 - c1 \cdot c2 & 0 \\ 0 & \frac{1}{fv}c1 & -\frac{1}{fv}cv \cdot c1 + s1 & 0 \\ 0 & -\frac{1}{h \cdot fv}c1 & \frac{1}{h \cdot fv}cv \cdot c1 - \frac{1}{h}s1 & 0 \end{bmatrix} \quad (1)$$

A height h indicates a height of the optical center O of the photographing unit 11 from ground as shown in FIG. 4.

In addition, c1=cos $\alpha$, c2=cos $\beta$, s1=sin $\alpha$, and s2=sin $\beta$. $\alpha$ and $\beta$ denote the pitch angle $\alpha$ and the yaw angle $\beta$ indicating the mounting angle of the photographing unit 11 described above.

Figure 5:
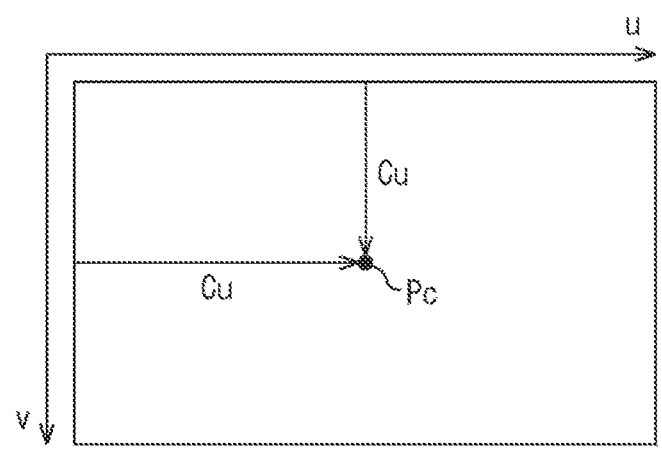
FIG. 5 is a diagram showing an example of an image coordinate system.

A focal length fu and a focal length fv indicate a focal length in the horizontal direction and a focal length in the perpendicular direction of the photographing unit 11.

cu and cv indicate coordinates of a center Pc of a photographed image in an image coordinate system constituted by a u axis in the horizontal direction and a v axis in the perpendicular direction as shown in FIG. 5.

Regarding a method of transforming a photographed image into a bird's eye image, details are disclosed in, for example, M. Aly, "Real time detection of lane markers in urban streets", In Intelligent Vehicles Symposium, 2008 IEEE, pages 7-12, IEEE, February 2008.

The function f2 (v, $\Delta$t) is a function for shifting a bird's eye image in a direction of travel of the vehicle 10. The function f2 (v, $\Delta$t) is mainly used to correct a deviation in photographic timings of a wide angle image and a telescopic image.

A vehicle speed v indicates a speed of the vehicle 10. A time difference $\Delta$T indicates a time difference between a photographic timing (a photographic time point) of the wide angle image and a photographic timing (a photographic time point) of the telescopic image.

In addition, the transforming unit 31 performs an adjustment (optimization processing) of function f1+f2 every time or at a prescribed timing such that a similarity between a wide angle bird's eye image and a telescopic wide angle image is increased (for example, maximized).

For example, first, the transforming unit 31 detects feature points of a wide angle image and a telescopic image.

A detection method of the feature points is not particularly limited.

Next, the transforming unit 31 detects at least three or more pairs of mutually corresponding feature points or, in other words, at least three or more pairs of feature points at same positions in the real world between the wide angle image and the telescopic image.

A detection method of the pairs of feature points is not particularly limited. For example, pairs of feature points are detected using ZNCC (Zero-means Normalized Cross-Correlation), SIFT (Scale-Invariant Feature Transform), or the like.

Next, using function f1+f2, the transforming unit 31 calculates positions of feature points that constitute each pair on the wide angle bird's eye image and the telescopic bird's eye image.

In addition, based on a positional relationship of corresponding feature points (feature points that constitute a pair) of the wide angle bird's eye image and the telescopic bird's eye image, the transforming unit 31 adjusts the pitch angle α, the yaw angle β, the roll angle γ, the scale s, and the vehicle speed v which are variables of function f1+f2. For example, the transforming unit 31 adjusts the pitch angle α, the yaw angle β, the roll angle γ, the scale s, and the vehicle speed v using a least-square method or the like so as to minimize a difference between coordinates of corresponding feature points of the wide angle bird's eye image and the telescopic bird's eye image.

The pitch angle α, the yaw angle β, and the roll angle γ are obtained as design values upon mounting the photographing unit 11 to the vehicle 10. However, since the position or an orientation of the photographing unit 11 may change due to motion of the vehicle 10, impact from the outside, and the like, a fine adjustment is desirably performed as described above.

In addition, the vehicle speed v is set based on data supplied from the motion control unit 13.

Furthermore, the transforming unit 31 supplies the compositing unit 32 with the wide angle bird's eye image and the telescopic bird's eye image.

As described above, by respectively transforming the wide angle image and the telescopic image into bird's eye images, two images photographed according to different viewpoints and different focal lengths are transformed onto a single domain. As a result, compositing of the two images can be readily performed.

In addition, while lane markings become line segments that head toward a vanishing point in a wide angle image and a telescopic image, the lane markings become parallel lines in a wide angle bird's eye image and a telescopic bird's eye image. As a result, detection accuracy of a lane marking improves.

In step S4, the compositing unit 32 composites two bird's eye images. Specifically, the compositing unit 32 generates a composite image by positioning and subsequently compositing the wide angle bird's eye image and the telescopic bird's eye image. The compositing unit 32 supplies the filtering unit 101 with the composite image.

For example, in a loop of the lane marking detection processing, the compositing unit 32 may perform feedback control using a detection result of a lane marking obtained in processing (to be described later) of step S9 performed prior to processing of step S4. For example, the compositing unit 32 positions the wide angle bird's eye image and the telescopic bird's eye image based on the number of lane markings, a dispersion of positions thereof, or the like detected in the processing of step S9. Accordingly, a compositing accuracy of the two bird's eye images improves.

In step S5, the filtering unit 101 performs filtering of the composite image. Specifically, the filtering unit 101 performs filtering of the composite image using a prescribed filter to extract an edge of the composite image. The filtering unit 101 supplies the binarizing unit 102 with an edge image obtained by extracting an edge of the composite image.

An arbitrary filter capable of extracting an edge of an image can be used as the filter to be used by the filtering unit 101.

In step S6, the binarizing unit 102 performs binarization processing. In other words, the binarizing unit 102 binarizes the edge image using a predetermined threshold. Accordingly, a binarized image indicating an edge portion of the composite image is generated. The binarizing unit 102 supplies the line segment detecting unit 103 with the binarized image.

In step S7, the line segment detecting unit 103 performs line segment detection processing. Specifically, the line segment detecting unit 103 detects a line segment inside the binarized image. The line segment detecting unit 103 supplies the spline processing unit 104 with a line segment-detected image indicating a detection result of a line segment.

An arbitrary method can be used in the line segment detection processing.

In step S8, the spline processing unit 104 performs spline processing. Specifically, the spline processing unit 104 performs spline processing with respect to the line segment-detected image to fit each line segment in the line segment-detected image to a curve model. Accordingly, a curve is detected in the line segment-detected image. The spline processing unit 104 supplies the lane marking detecting unit 105 with a spline image indicating a detection result of a curve.

For example, an arbitrary method such as RANSAC (Random Sampling Consensus) can be used in the spline processing.

In step S9, the line marking detecting unit 105 performs detection processing of a lane marking. For example, based on a shape of each curve, a width between curves, and the like, the lane marking detecting unit 105 extracts a curve constituting a lane marking among the curves in the spline image. In addition, the line marking detecting unit 105 detects a lane marking constituted by the detected curve. The lane marking detecting unit 105 supplies the compositing unit 32 and the motion control unit 13 with data indicating a detection result of a lane marking.

An arbitrary method can be used in the detection processing of a lane marking.

The motion control unit 13 controls motion of the vehicle 10 based on the detection result of a lane marking on the road in front of the vehicle 10 and the like. For example, the motion control unit 13 detects a lane of the road in front based on lane markings on the road in front. In addition, for example, based on a detection result of a lane, the motion control unit 13 performs control (lane control) in a direction of travel of the vehicle 10 such that the vehicle 10 travels inside a lane in a stable manner. Furthermore, for example, based on a detection result of a lane, the motion control unit 13 performs control of a lane change by the vehicle 10 and detection processing of a vehicle in an adjacent lane.

Subsequently, processing returns to step S1 and processing subsequent to step S1 is executed.

In this manner, detection accuracy of a lane marking on the road in front of the vehicle 10 can be improved.

For example, FIGS. 6A, 6B, and 6C show an example of ranges of a wide angle bird's eye image and a telescopic bird's eye image. Specifically, a range Pg1 in FIG. 6A represents an example of a range captured in a wide angle bird's eye image. A range Pg2 in FIG. 6B represents an example of a range captured in a telescopic bird's eye image. FIG. 6C shows an example of a range captured in a composite image obtained by compositing the wide angle bird's eye image and the telescopic bird's eye image As described above, in the vehicle 10, a lane marking can be detected using information on a wider range as compared to a case where a wide angle bird's eye image or a telescopic bird's eye image is used independently. Therefore, due to an increased amount of information, detection accuracy of a lane marking by the detecting unit 22 improves. In addition, lane markings of a wider range can be detected at once. For example, a lane marking at a greater distance or a lane marking of a lane adjacent to a lane being traveled by the vehicle 10 can be detected.

In addition, when lane markings from a wide angle bird's eye image and a telescopic bird's eye image are individually detected and detection results are subsequently composited, errors and the like may create an inconsistency between the two detection results. In addition, complex arithmetic processing is required to composite the detection results. On the other hand, compositing the two bird's eye image and then detecting a lane marking prevents the occurrence of an inconsistency between the detection results described above. In addition, since compositing processing of images requires a smaller amount of calculations than compositing processing of detection results, the amount of calculations can be reduced.

Furthermore, detection accuracy of a lane marking can be further improved by, for example, optimizing a transformation function from a photographed image to a bird's eye image so as to maximize a similarity between a wide angle bird's eye image and a telescopic wide angle image.

2. Second Embodiment

Next, a second embodiment of the present technique will be described with reference to FIGS. 7 and 8.

<Configuration Example of Vehicle 200>

Figure 7:
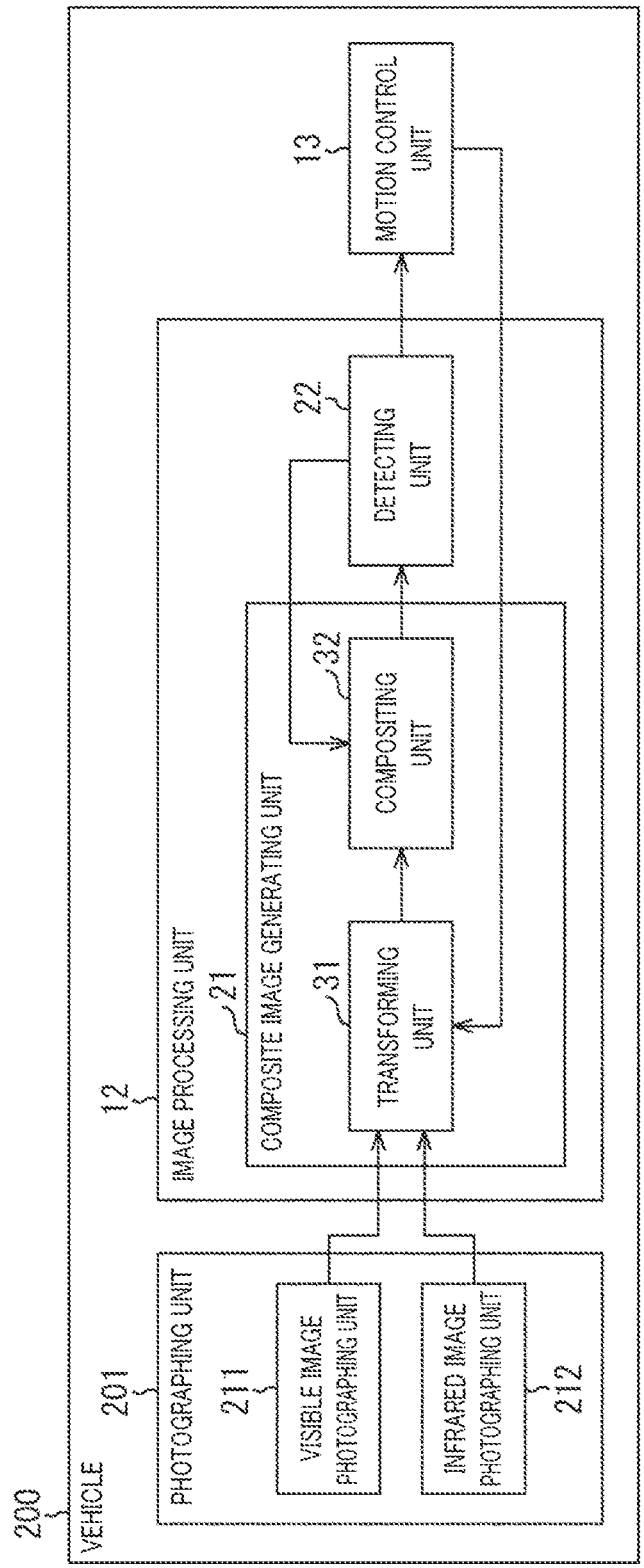
FIG. 7 is a block diagram showing a second embodiment of a vehicle to which the present technique has been applied.
Figure 8:
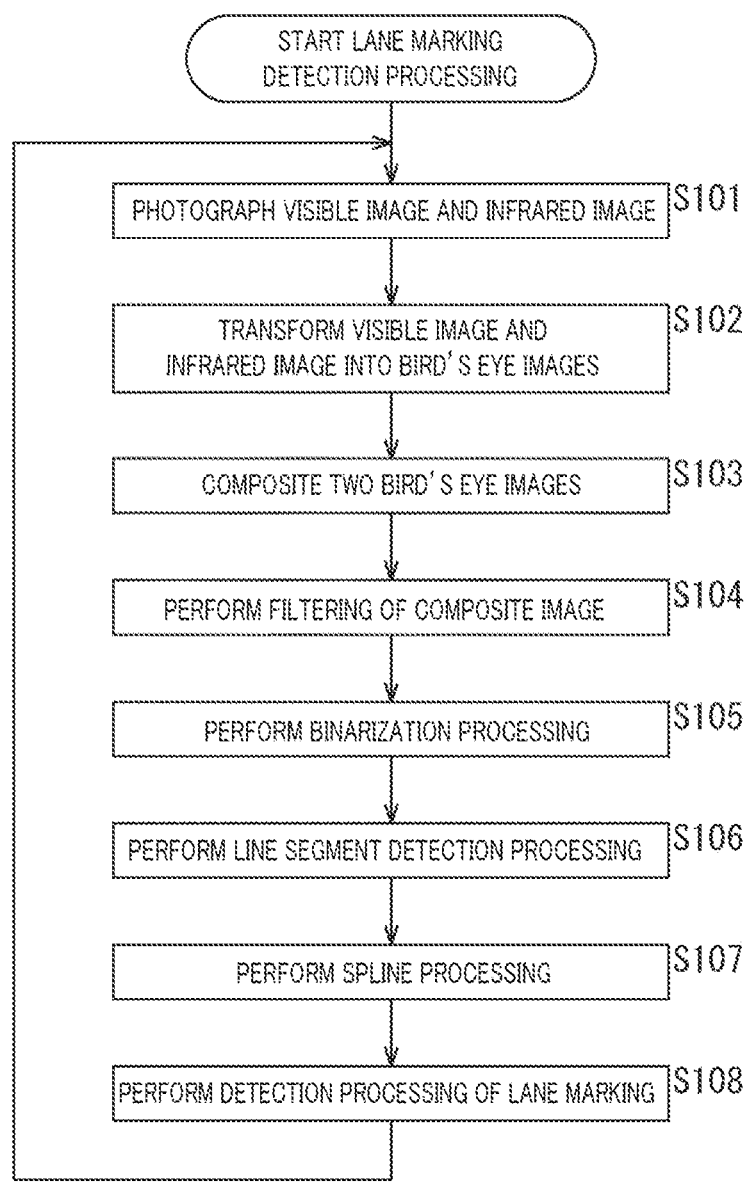
FIG. 8 is a flow chart for explaining lane marking detection processing to be executed by the vehicle shown in FIG. 7.

FIG. 7 shows a configuration example of a vehicle 200 that represents a second embodiment of a vehicle to which the present technique has been applied. In the diagram, portions corresponding to those of the vehicle 10 shown in FIG. 1 are denoted by same reference signs and descriptions thereof will be omitted when appropriate.

A vehicle 200 differs from the vehicle 10 in that the vehicle 200 includes a photographing unit 201 instead of the photographing unit 11. The photographing unit 201 includes a visible image photographing unit 211 and an infrared image photographing unit 212 of which wavelength regions to be a photographic target differ from each other.

The visible image photographing unit 211 includes, for example, a photographing apparatus having sensitivity to visible light. The visible image photographing unit 211 photographs the front of the vehicle 200 and supplies the transforming unit 31 with an image (hereinafter, referred to as a visible image) obtained as a result of the photography.

The infrared image photographing unit 212 includes, for example, a photographing apparatus having sensitivity to infrared light. The infrared image photographing unit 212 photographs the front of the vehicle 200 and supplies the transforming unit 31 with an image (hereinafter, referred to as an infrared image) obtained as a result of the photography.

A visible image and a captured image have partially overlapping photographing ranges.

<Lane Marking Detection Processing>

Next, lane marking detection processing to be executed by the vehicle 200 will be described with reference to the flow chart shown in FIG. 8.

For example, the processing is started when the vehicle 200 is started and an operation for starting driving is performed such as when an ignition switch, a power switch, a start switch, or the like of the vehicle 200 is turned on. In addition, for example, the processing is ended when an operation for ending driving is performed such as when the ignition switch, the power switch, the start switch, or the like of the vehicle 200 is turned off.

In step S101, the visible image photographing unit 211 and the infrared image photographing unit 212 photographs a visible image and an infrared image. Specifically, the visible image photographing unit 211 photographs the front of the vehicle 200 and supplies the transforming unit 31 with a visible image obtained as a result of the photography. The infrared image photographing unit 212 photographs the front of the vehicle 200 and supplies the transforming unit 31 with an infrared image obtained as a result of the photography.

In step S102, the transforming unit 31 transforms the visible image and the infrared image into bird's eye images. In other words, the transforming unit 31 transforms the visible image and the infrared image into bird's eye images by processing similar to that of step S3 in FIG. 3 described earlier.

Hereinafter, the bird's eye image transformed from the visible image will be referred to as a visible bird's eye image and the bird's eye image transformed from the infrared image will be referred to as an infrared bird's eye image.

The transforming unit 31 supplies the compositing unit 32 with the visible bird's eye image and the infrared bird's eye image.

Since a visible image and an infrared image are photographed by different photographing units, values of variables given to the transformation function f1+f2 differ between the visible image and the infrared image. Therefore, when performing optimization processing of the transformation function f1+f2 described earlier, optimal values of the variables assume different values between the visible image and the infrared image.

Figure 3:
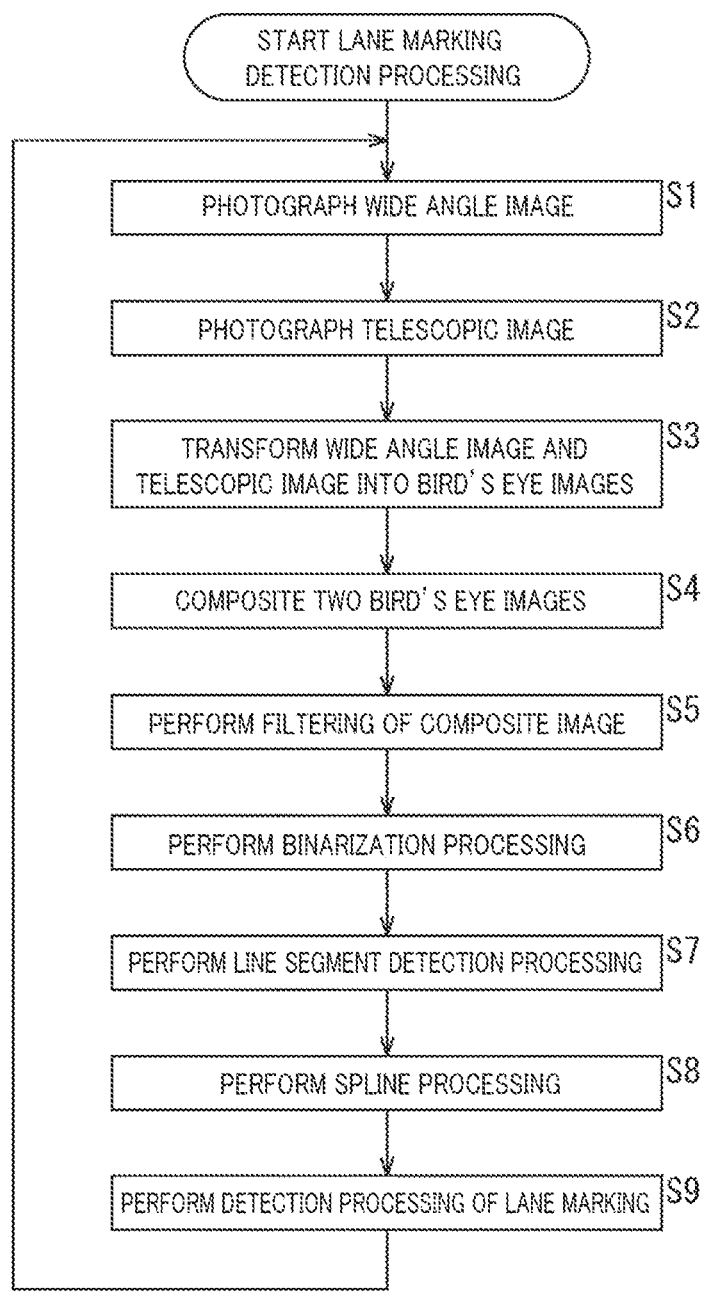
FIG. 3 is a flow chart for explaining lane marking detection processing to be executed by the vehicle shown in FIG. 1.

In step S103, the compositing unit 32 composites the two bird's eye images, namely, the visible bird's eye image and the infrared bird's eye image by processing similar to that of step S3 in FIG. 3. The compositing unit 32 supplies the filtering unit 101 of the detecting unit 22 with the composite image.

Subsequently, in step S104 to step S108, processing similar to that of step S5 to step S9 in FIG. 3 is executed. In other words, a lane marking on the road in front of the vehicle 200 is detected based on the composite image obtained by compositing the visible bird's eye image and the infrared bird's eye image.

Subsequently, processing returns to step S101 and processing subsequent to step S101 is executed.

As described above, by detecting a lane marking on the road in front of the vehicle 200 based on the composite image obtained by compositing the visible bird's eye image and the infrared bird's eye image, detection accuracy of a lane marking improves particularly during nighttime or at dark places such as the inside of a tunnel. For example, when only a visible image is used, a lane marking can only be accurately detected in a region (hereinafter, referred to as an illuminated region) that is illuminated by lighting such as a headlight of the vehicle 200 or a street light. In contrast, by also using an infrared image, a lane marking in regions (hereinafter, referred to as non-illuminated regions) other than the illuminated region can also be detected with accuracy.

In addition, since using the composite image obtained by compositing the visible bird's eye image and the infrared bird's eye image enables the detecting unit 22 to perform detection processing of a lane marking based on a larger amount of information, detection accuracy improves. For example, since an infrared image normally contains a large amount of noise, it is difficult to detect a lane marking with accuracy when only an infrared image is used. In contrast, for example, by adopting a detection result of a lane marking inside the illuminated region of the visible bird's eye image as a clue, detection processing of a lane marking in a non-illuminated region of the infrared bird's eye image can be performed. Accordingly, detection accuracy of a lane marking of a non-illuminated region improves.

Furthermore, by detecting a lane marking after compositing the visible bird's eye image and the infrared bird's eye image, an occurrence of an inconsistency between detection results based on the two images can be prevented and an amount of calculations can be reduced in a similar manner to the first embodiment described earlier.

In addition, detection accuracy of a lane marking can be further improved by optimizing a transformation function from a photographed image to a bird's eye image.

3. Modifications

Hereinafter, modifications of the embodiments of the present technique described above will be described.

While examples of using the present technique in detection processing of a lane marking in front of a vehicle have been described above, the present technique can also be applied to detection processing of a lane marking in directions other than the front of the vehicle.

In addition, the present technique can also be applied to other detection processing related to a road around the vehicle (for example, the front of the vehicle).

For example, the present technique can be applied to detection processing of a shoulder, a margin, or a sidewalk of a road around the vehicle.

In addition, for example, the present technique can be applied to detection processing of a travelable region of a road around the vehicle (for example processing for separating a driveway from a sidewalk).

Furthermore, while examples in which two photographed images are respectively transformed into bird's eye images and a composite image obtained by compositing the bird's eye images is used in detection processing have been described above, three or more photographed images may be respectively transformed into bird's eye images and a composite image obtained by compositing the bird's eye images may be used in detection processing.

In addition, for example, configurations of photographing units may be modified as deemed appropriate.

For example, in the first embodiment, a wide angle image and a telescopic image may be photographed by different photographing apparatuses (for example, a wide angle camera and a telescopic camera).

In addition, a plurality of photographing apparatuses may be provided such that various directions (for example, the front, the side, the rear, and the like) of the vehicle are photographed and that a part of a photographing range of one photographing apparatus overlaps with that of at least one of the other photographing apparatuses. Furthermore, photographed images obtained by photographing the respective directions may be converted into bird's eye images and a composite image obtained by compositing the bird's eye images may be used in detection processing.

Furthermore, types of vehicles to which the present technique can be applied are not particularly limited. In addition, besides the vehicle exemplified earlier, the present technique can also be applied to other mobile bodies that travel on a road surface such as personal mobility, construction machinery, agricultural and farm machinery (tractors), and robots. Furthermore, the present technique can also be applied to mobile bodies that are remotely operated (manipulated) without carrying a user such as a robot and mobile bodies that travel autonomously.

When applying the present technique to a mobile body that travels a passage other than a road, for example, detection processing related to a passage around the mobile body (for example, detection processing of a lane marking such as a corridor inside a building) can be performed.

4. Other

<Configuration Example of Computer>

The series of processing described above can be executed by hardware or by software. When the series of processing is to be executed by software, a program constituting the software is installed in a computer. Examples of the computer in this case include a computer built into dedicated hardware and a general-purpose personal computer or the like capable of executing various functions when various programs are installed therein.

Figure 9:
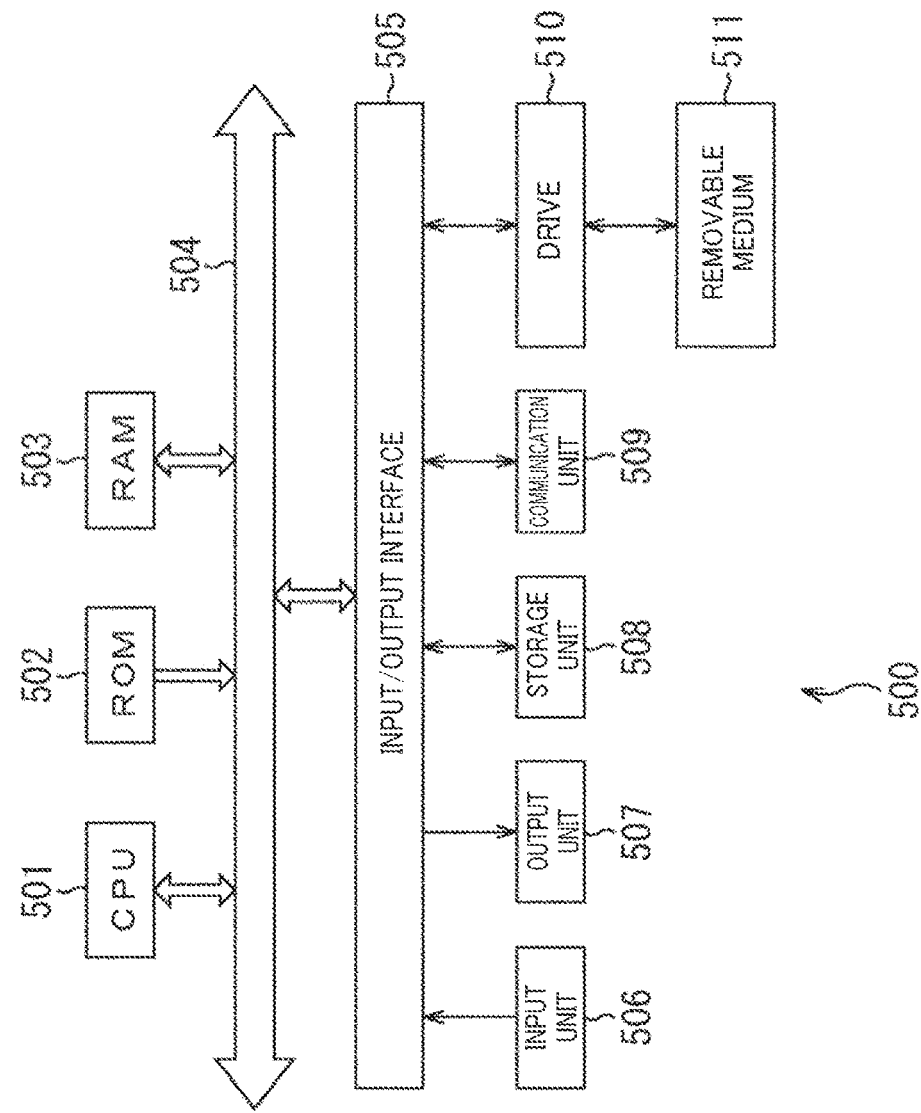
FIG. 9 is a diagram showing a configuration example of a computer.

FIG. 9 is a block diagram showing a configuration example of hardware of a computer that executes the series of processing described above with a program.

In a computer 500, a CPU (Central Processing Unit) 501, a ROM (Read Only Memory) 502, and a RAM (Random Access Memory) 503 are connected to each other by a bus 504.

An input/output interface 505 is further connected to the bus 504. An input unit 506, an output unit 507, a recording unit 508, a communication unit 509, and a drive 510 are connected to the input/output interface 505.

The input unit 506 is constituted by an input switch, a button, a microphone, an imaging element, or the like. The output unit 507 is constituted by a display, a speaker, or the like. The recording unit 508 is constituted by a hard disk, a non-volatile memory, or the like. The communication unit 509 is constituted by a network interface or the like. The drive 510 drives a removable medium 511 that is a magnetic disk, an optical disk, a magneto optical disk, a semiconductor memory, or the like.

In the computer 500 configured as described above, the series of processing described above is performed as the CPU 501 loads a program recorded in the recording unit 508 onto the RAM 503 via the input/output interface 505 and the bus 504 and executes the program.

For example, the program executed by the computer 500 (the CPU 501) can be provided by being recorded on the removable medium 511 as a packaged medium or the like. Alternatively, the program can be provided via a wired or wireless transmission medium such as a local area network, the Internet, or digital satellite broadcasting.

In the computer 500, the program can be installed in the recording unit 508 via the input/output interface 505 by mounting the removable medium 511 to the drive 510. In addition, the program can be received by the communication unit 509 via a wired or wireless transmission medium and installed in the recording unit 508. Alternatively, the program can be installed in the ROM 502 or the recording unit 508 in advance.

The program to be executed by the computer may be a program which causes processing to be time-sequentially performed along an order described in the present specification or a program which causes processing to be performed in parallel or at necessary timings such as when a call is made.

In addition, in the present specification, a system signifies a set of a plurality of components (apparatuses, modules (parts), and the like), and whether or not all of the components are present inside a same casing does not matter. Therefore, a plurality of apparatuses which are housed in separate casings and which are connected to each other via a network and a single apparatus in which a plurality of modules are housed in a single casing are both considered systems.

Furthermore, embodiments of the present technique are not limited to the embodiments described above and various modifications can be made without departing from the gist of the present technique.

For example, the present technique may adopt a configuration of cloud computing in which a single function is shared among and cooperatively processed by a plurality of apparatuses via a network.

In addition, each step explained in the flow charts described above can be executed in a shared manner by a plurality of apparatuses in addition to being executed by a single apparatus.

Furthermore, when a single step includes a plurality of processing steps, the plurality of processing steps included in the single step can be executed in a shared manner by a plurality of apparatuses in addition to being executed by a single apparatus.

<Examples of Configuration Combinations>

The present technique can also be configured as follows.

(1)
An information processing apparatus, including;
a transforming unit configured to respectively transform a plurality of photographed images with partially overlapping photographing ranges into bird's eye images;
a compositing unit configured to generate a composite image by compositing a plurality of the bird's eye images; and
a detecting unit configured to perform detection processing related to a passage around a mobile body based on the composite image.

(2)
The information processing apparatus according to (1), wherein
a plurality of the photographed images differ from one another in at least one of an angle of view, a wavelength region, and a photographing apparatus used for photography.

(3)
The information processing apparatus according to (2), wherein
each of the photographed images is photographed at a different angle of view by a same photographing apparatus.

(4)
The information processing apparatus according to (2) or (3), wherein
a plurality of the photographed images include a visible image and an infrared image.

(5)
The information processing apparatus according to (4), wherein
the visible image and the infrared image are photographed by different photographing apparatuses.

(6)
The information processing apparatus according to any one of (1) to (5), wherein
the detecting unit is configured to perform detection processing of a lane marking of the passage.

(7)
The information processing apparatus according to (6), wherein
the compositing unit is configured to composite a plurality of the bird's eye images using a detection result of a lane marking of the passage.

(8)
The information processing apparatus according to any one of (1) to (7), wherein
the detecting unit is configured to perform detection processing of a travelable region of the passage.

(9)
The information processing apparatus according to any one of (1) to (8), wherein
the detecting unit is configured to perform detection processing of a shoulder, a margin, or a sidewalk of a road as the passage.

(10)
The information processing apparatus according to any one of (1) to (9), wherein
the transforming unit is configured to adjust a transformation function used in a transformation from the photographed image to the bird's eye image such that a similarity among a plurality of the bird's eye images increases.

(11)
The information processing apparatus according to (10), wherein
the transforming unit is configured to adjust values of variables of the transformation function based on a positional relationship of corresponding feature points among a plurality of the bird's eye images.

(12)
The information processing apparatus according to (11), wherein
the variables include at least one of a mounting angle of a photographing apparatus used to photograph the photographed image to the mobile body, an enlargement ratio or a reduction ratio of the bird's eye image, and a speed of the mobile body.

(13)
The information processing apparatus according to any one of (1) to (12), further including
a photographing unit configured to photograph a plurality of the photographed images.

(14)
An information processing method, including the steps of:
respectively transforming a plurality of photographed images with partially overlapping photographing ranges into bird's eye images;
generating a composite image by compositing a plurality of the bird's eye images; and
performing detection processing related to a passage around a mobile body based on the composite image.

(15)

A program for causing a computer to execute processing for:
respectively transforming a plurality of photographed images with partially overlapping photographing ranges into bird's eye images;
generating a composite image by compositing a plurality of the bird's eye images; and
performing detection processing related to a passage around a mobile body based on the composite image.

(16)

A mobile body, including:
a photographing unit configured to photograph a plurality of photographed images with partially overlapping photographing ranges;
a transforming unit configured to respectively transform a plurality of the photographed images into bird's eye images;
a compositing unit configured to generate a composite image by compositing a plurality of the bird's eye images;
a detecting unit configured to perform detection processing related to a passage around a mobile body based on the composite image; and
a motion control unit configured to control motion based on a result of the detection processing.

It should be noted that the advantageous effects described in the present specification are merely exemplary and are not restrictive, and other advantageous effects may be produced.

REFERENCE SIGNS LIST

10 Vehicle
11 Photographing unit
12 Image processing unit
13 Motion control unit
21 Composite image generating unit
22 Detecting unit
31 Transforming unit
32 Compositing unit
200 Vehicle
201 Photographing unit
211 Visible image photographing unit
212 Infrared image photographing unit

The invention claimed is:

1. An information processing apparatus, comprising:
a central processing unit (CPU) configured to:
transform a plurality of photographed images with partially overlapping photographing ranges into bird's eye images;
perform, based on the bird's eye images, a detection processing of a lane marking of a passage around a mobile body to generate a detection result of the lane marking;
generate a composite image by compositing the bird's eye images using the detection result; and
perform the detection processing based on the composite image to detect the lane marking of the passage around the mobile body.

2. The information processing apparatus according to claim 1, wherein the plurality of the photographed images differ from one another in at least one of an angle of view, a wavelength region, or a photographing apparatus used for a photography of the plurality of photographed images.

3. The information processing apparatus according to claim 2, wherein each of the plurality of photographed images is photographed at a different angle of view by the photographing apparatus.

4. The information processing apparatus according to claim 2, wherein the plurality of the photographed images include a visible image and an infrared image.

5. The information processing apparatus according to claim 4, wherein the visible image and the infrared image are photographed by different photographing apparatuses.

6. The information processing apparatus according to claim 1, wherein the CPU is further configured to perform the detection processing of a travelable region of the passage.

7. The information processing apparatus according to claim 1, wherein the CPU is further configured to perform the detection processing of a shoulder, a margin, or a sidewalk of a road as the passage.

8. The information processing apparatus according to claim 1, wherein the CPU is further configured to adjust a transformation function used in the transformation of the plurality of photographed images to the bird's eye images.

9. The information processing apparatus according to claim 8, wherein the CPU is further configured to adjust values of variables of the transformation function based on a positional relationship of corresponding feature points among the bird's eye images.

10. The information processing apparatus according to claim 9, wherein the variables include at least one of a mounting angle of a photographing apparatus on the mobile body for photographing the plurality of photographed images, an enlargement ratio or a reduction ratio of each of the bird's eye images, or a speed of the mobile body.

11. The information processing apparatus according to claim 1, further comprising a photographing apparatus configured to photograph the plurality of the photographed images.

12. An information processing method, comprising:
transforming a plurality of photographed images with partially overlapping photographing ranges into bird's eye images;
performing, based on the bird's eye images, a detection processing of a lane marking of a passage around a mobile body to generate a detection result of the lane marking;
generating a composite image by compositing the bird's eye images using the detection result; and
performing the detection processing based on the composite image to detect the lane marking of the passage around the mobile body.

13. A non-transitory computer-readable medium having stored thereon, computer-executable instructions which, when executed by a computer, cause the computer to execute operations, the operations comprising:
transforming a plurality of photographed images with partially overlapping photographing ranges into bird's eye images;
performing, based on the bird's eye images, a detection processing of a lane marking of a passage around a mobile body to generate a detection result of the lane marking;
generating a composite image by compositing the bird's eye images using the detection result; and
performing the detection processing based on the composite image to detect the lane marking of the passage around the mobile body.

14. A mobile body, comprising:

a photographing apparatus configured to photograph a plurality of photographed images with partially overlapping photographing ranges; and a central processing unit (CPU) configured to:

- transform a plurality of the photographed images into bird's eye images;
- perform, based on the bird's eye images, a detection processing of a lane marking of a passage around the mobile body to generate a detection result of the lane marking
- generate a composite image by compositing the bird's eye images using the detection result;
- perform the detection processing based on the composite image to detect the lane marking of the passage around the mobile body; and
- control a motion of the mobile body based on the detected lane marking.

\* \* \* \* \*